United States Patent
Ivanovic et al.

(10) Patent No.: US 10,875,531 B2
(45) Date of Patent: Dec. 29, 2020

(54) VEHICLE LATERAL MOTION CONTROL

(71) Applicant: Ford Global Technologies, LLC, Dearborn, MI (US)

(72) Inventors: Vladimir Ivanovic, Canton, MI (US); Hongtei Eric Tseng, Canton, MI (US); Nitendra Nath, Troy, MI (US); Pavithra Madhavan, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/058,495

(22) Filed: Aug. 8, 2018

(65) Prior Publication Data

US 2020/0047752 A1 Feb. 13, 2020

(51) Int. Cl.
*B60W 30/12* (2020.01)
*G06K 9/00* (2006.01)
*B60W 40/072* (2012.01)
*G05D 1/00* (2006.01)
*G05D 1/02* (2020.01)

(52) U.S. Cl.
CPC .......... *B60W 30/12* (2013.01); *B60W 40/072* (2013.01); *G05D 1/0088* (2013.01); *G05D 1/0212* (2013.01); *G06K 9/00798* (2013.01); *B60W 2420/42* (2013.01); *B60W 2520/10* (2013.01); *B60W 2520/14* (2013.01); *B60W 2720/24* (2013.01); *G05D 2201/0213* (2013.01)

(58) Field of Classification Search
None
See application file for complete search history.

(56) References Cited

U.S. PATENT DOCUMENTS

| 7,522,091 | B2 | 4/2009 | Cong et al. |
| 8,160,780 | B2* | 4/2012 | Shin ..................... B62D 5/0481 180/204 |
| 8,190,330 | B2* | 5/2012 | Lee .................... B62D 15/0255 342/71 |
| 8,755,063 | B2 | 6/2014 | Gangai |
| 8,983,765 | B2 | 3/2015 | Deng et al. |
| 9,037,348 | B2 | 5/2015 | Gunia et al. |
| 2012/0022739 | A1* | 1/2012 | Zeng ..................... B60W 30/12 701/536 |
| 2016/0257342 | A1* | 9/2016 | Ueda .................... B62D 15/026 |
| 2017/0101094 | A1* | 4/2017 | Fiaschetti ............ B60W 30/12 |
| 2017/0242095 | A1 | 8/2017 | Schuh et al. |
| 2017/0370985 | A1* | 12/2017 | Rachmawati ........... G05B 9/02 |
| 2018/0137376 | A1* | 5/2018 | Suzuki ............... G06K 9/00805 |
| 2019/0033465 | A1* | 1/2019 | Kido ...................... G01S 19/07 |

FOREIGN PATENT DOCUMENTS

| CN | 102951151 A | 3/2013 |
| DE | 102010033530 A1 | 12/2011 |
| DE | 102013002889 A1 | 8/2014 |

* cited by examiner

*Primary Examiner* — Yuen Wong
*Assistant Examiner* — Hongye Liang
(74) *Attorney, Agent, or Firm* — Frank A. MacKenzie; Bejin Bieneman PLC

(57) ABSTRACT

A lane curvature, a vehicle position offset relative to a lane center line, and a vehicle heading are determined based on image data received from a vehicle camera sensor. An adjusted lane curvature and an adjusted vehicle heading are computed based on a vehicle speed, a vehicle yaw rate and the position offset.

17 Claims, 4 Drawing Sheets

VEHICLE LATERAL MOTION CONTROL

BACKGROUND

One or more computers can be programmed to control vehicle operations, e.g., as a vehicle travels on a road. For example, a computer may control vehicle operation by maintaining a vehicle location at a center of a lane (i.e., same distance from a right and a left line defining the vehicle lane). However, an error in determining the location of the lane center by the vehicle computer may cause the vehicle to operate unsafely and/or inefficiently.

DETAILED DESCRIPTION

Introduction

Figure 1:
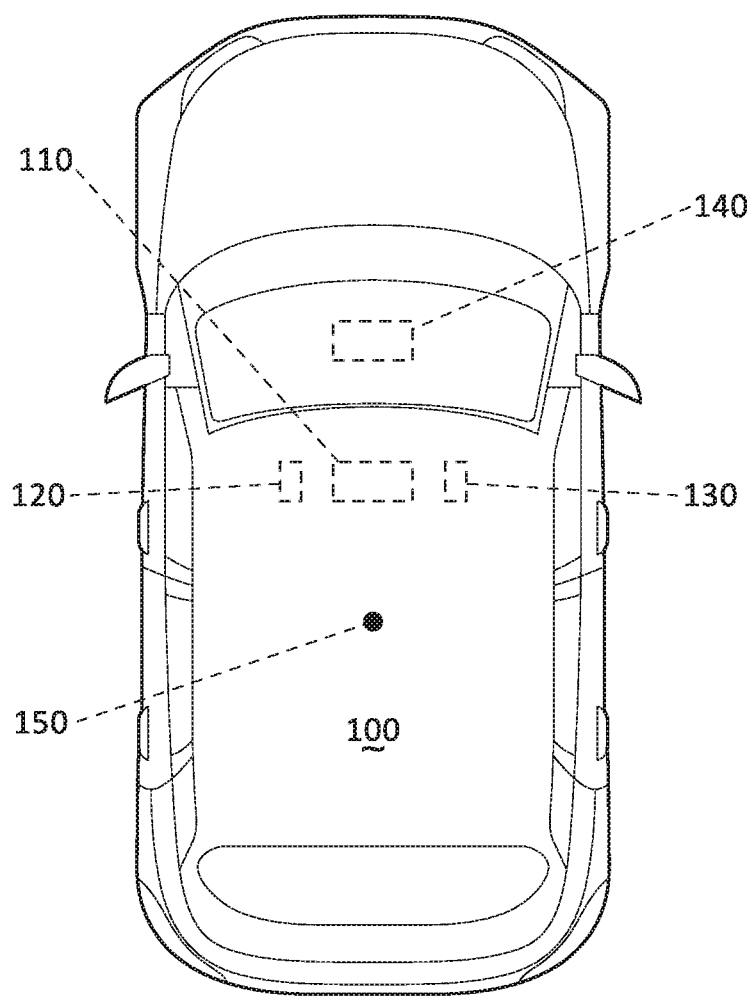
FIG. 1 is a diagram illustrating an example vehicle.

Disclosed herein is a method including determining, based on image data received from a vehicle camera sensor, a lane curvature, a vehicle position offset relative to a lane center line, and a vehicle heading, and computing an adjusted lane curvature and an adjusted vehicle heading based on a vehicle speed, a vehicle yaw rate and the position offset.

The method may further include performing vehicle lane centering based on the position offset, the adjusted vehicle heading, and the adjusted lane curvature.

The vehicle position offset may be a lateral distance of a reference point of the vehicle to a nearest point on the center line.

The vehicle heading may be defined by a vehicle longitudinal axis from a vehicle reference point in a direction of a vehicle movement.

The method may further include determining a yaw rate bias and a vehicle heading offset bias, and computing an adjusted lane curvature and an adjusted vehicle heading further based on the yaw rate bias and the vehicle heading offset bias.

The method may further include determining a vehicle heading offset based on the lane curvature, and computing the adjusted vehicle heading offset and the adjusted lane curvature based at least in part on the vehicle heading offset.

The method may further include computing the adjusted lane curvature and the adjusted vehicle heading based on a variance of vehicle heading offset noise and a variance of a vehicle position offset noise.

The method may further include computing the adjusted lane curvature based on the lane curvature determined based on the received image data, a yaw rate bias, and a vehicle speed.

Further disclosed herein is a system including a processor and a memory. The memory stores instructions executable by the processor to determine, based on image data received from a vehicle camera sensor, a lane curvature, a vehicle position offset relative to a lane center line, and a vehicle heading; and to compute an adjusted lane curvature and an adjusted vehicle heading based on a vehicle speed, a vehicle yaw rate and the position offset.

The instructions may further include instructions to perform vehicle lane centering based on the position offset, the adjusted vehicle heading, and the adjusted lane curvature.

The vehicle position offset may be a lateral distance of a reference point of the vehicle to a nearest point on the center line.

The vehicle heading may be defined by a vehicle longitudinal axis from a vehicle reference point in a direction of a vehicle movement.

The instructions may further include instructions to determine a yaw rate bias and a vehicle heading offset bias, and to compute an adjusted lane curvature and an adjusted vehicle heading further based on the yaw rate bias and the vehicle heading offset bias.

The instructions may further include instructions to determine a vehicle heading offset based on the lane curvature, and to compute the adjusted vehicle heading offset and the adjusted lane curvature based at least in part on the vehicle heading offset.

The instructions may further include instructions to compute the adjusted lane curvature and the adjusted vehicle heading based on a variance of vehicle heading offset noise and a variance of a vehicle position offset noise.

The instructions may further include instructions to compute the adjusted lane curvature based on the lane curvature determined based on the received image data, a yaw rate bias, and a vehicle speed.

Further disclosed herein is a system including means for determining, based on image data received from a vehicle camera sensor, a lane curvature, a vehicle position offset relative to a lane center line, and a vehicle heading, and means for computing an adjusted lane curvature and an adjusted vehicle heading based on a vehicle speed, a vehicle yaw rate and the position offset.

The system may further include means for performing vehicle lane centering based on the position offset, the adjusted vehicle heading, and the adjusted lane curvature.

The system may further include means for determining a yaw rate bias and a vehicle heading offset bias, and means for computing an adjusted lane curvature and an adjusted vehicle heading further based on the yaw rate bias and the vehicle heading offset bias.

The system may further include means for determining a vehicle heading offset based on the lane curvature, and means for computing the adjusted vehicle heading offset and the adjusted lane curvature based at least in part on the vehicle heading offset.

Further disclosed is a computing device programmed to execute any of the above method steps.

Yet further disclosed is a computer program product, comprising a computer readable medium storing instructions executable by a computer processor, to execute any of the above method steps.

Exemplary System Elements

A vehicle computer may be programmed to perform a lateral motion control (LMC), e.g., maintaining a lateral position of a vehicle at a center of a lane while the vehicle travels on a road. The computer may be programmed to determine a vehicle position relative to a lane center line based on sensor data including image data received from one or more vehicle camera sensors and to actuate a vehicle steering actuator to maintain a vehicle position with respect to, e.g., the center line based on the received sensor data. However, the computer may fail, at least at some times, to maintain the vehicle at the center line, e.g., due to making inaccurate determinations of the vehicle position, lane curvature, etc.

The vehicle computer may be programmed to determine, based on image data received from a vehicle camera sensor, a lane curvature, a vehicle position offset relative to a lane center line, and a vehicle heading, and to compute an adjusted lane curvature and an adjusted vehicle heading based on a vehicle speed, a vehicle yaw rate and the vehicle position offset. Thus, the vehicle operation with respect to maintaining the vehicle's position in a lane, may be improved by steering the vehicle based at least in part on the adjusted lane curvature and/or the adjusted vehicle heading.

FIG. 1 illustrates an example vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI 140). A vehicle 100 has a reference point 150, i.e., a specified point within a space defined by the vehicle body, e.g., a geometrical center point at which respective longitudinal and lateral center axes of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering, and none of these in a non-autonomous or manual mode.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a wireless vehicular communication interface with other traffic participants (e.g., vehicles, infrastructure, pedestrian, etc.), e.g., via a vehicle-to-vehicle communication network and/or a vehicle-to-infrastructure communication network. The vehicular communication network represents one or more mechanisms by which the computers 110 of vehicles 100 may communicate with other traffic participants, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary vehicular communication networks include cellular, Bluetooth, IEEE 802.11, dedicated short range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100. In one example, the vehicle 100 may include an electronic power steering (EPS) actuator 120 and the computer 110 may be programmed to output a torque command to the EPS actuator 120 to steer the vehicle 100, i.e., steer the vehicle 100 to a right or left direction. The torque command may include a message including a numerical torque value, e.g., 1 Newton Meter (Nm). In one example, the message may include a positive torque value for steering to a right direction and a negative torque value for steering to a left direction.

The sensors 130 may include a variety of devices known to provide data to the computer 110. The sensors 130 may include camera sensor(s) 130, e.g. to provide a front view, side view, etc., providing images from an area surrounding the vehicle 100. For example, the computer 110 may be programmed to receive image data from a camera sensor(s) 130 and to implement image processing techniques, e.g., edge detection, image classification, etc., to detect lane(s) 200 of a multilane and/or a single-lane road, lane boundaries 210 (or markings), etc. The computer 110 may be programmed to determine, e.g., a vehicle 100 position offset $e_y$, relative to road center line 220, etc., based at least in part on image data received from the camera sensor(s) 130 (see FIG. 2). The computer 110 may be further programmed to determine a current vehicle 100 location based on location coordinates, e.g., GPS coordinates, received from a vehicle 100 location (e.g., GPS) sensor 130. The computer 110 may be programmed to receive physical attributes data including speed, location coordinates, yaw rate, etc., from the vehicle 100 sensor(s) 130. The computer 110 may be programmed to determine a vehicle 100 heading $\psi$, measured in degrees, radians, etc., based on data received from a vehicle 100 location sensor 130 and/or camera sensor 130. Further, the computer 110 may be programmed to determine a vehicle 100 heading offset $e_\psi$, (i.e., the vehicle 100 heading $\psi$ relative to a lane curvature $\kappa_{road}$), as discussed below with reference to FIG. 2.

In one example, the computer 110 may be programmed to detect road boundaries 210 based on image histograms. An image histogram is a statistical representation of an intensity distribution of a digital image, e.g., as received from the camera sensor 130. Each pixel of an image received may have an intensity within a predetermined range, e.g., 0% to 100%. The computer 110 may be programmed to identify homogenous regions of the received image based on changes in intensity of image pixels, e.g., gradients, gray levels, etc., and to determine contour points such as boundaries 210 based on edges, i.e., transition lines between, the identified homogenous regions. Additionally or alternatively, the computer 110 may be programmed to identify boundaries 210 by performing a segmentation of image data and determining the boundaries 210 based on segmentation results. "Image segmentation" is a process of partitioning a digital image into multiple segments (i.e., sets of pixels). A goal of segmentation is to simplify and/or change a representation of an image so that image data is more meaningful and/or easier to analyze (e.g., by reducing a set of data, e.g., number of pixels, to be analyzed by grouping pixels into segments). Image segmentation includes assigning a label to each pixel in an image such that pixels with the same label share certain characteristics, e.g., being a part of a lane marking. Image segmentation is typically utilized to locate objects and boundaries (lines, curves, etc.) in images, e.g., an image can be segmented by identifying pixels with values, e.g., intensities, colors, etc., in a certain range and assigning the respective value(s), e.g., intensity, color, etc., according to some statistical measure for pixels in the segment, e.g., an average, a max, a min, etc. In some conditions, e.g., inclement weather, the computer 110 may receive image data in which at least portions of the boundaries 210 may lack sufficient data to be detectable. Additionally or alternatively, using conventional curve fitting techniques, the computer 110 may be programmed to estimate a boundary 210 of road lane 200 in areas where image data lacks sufficient image data, by fitting a curve based on detected portions of the boundary 210, i.e., based on those portions of the boundary 210 that are detectable based on image processing techniques.

Further, the computer 110 may be programmed to determine a vehicle 100 position offset $e_y$ relative to a lane 200 center line 220 using conventional image processing techniques. For example, the computer 110 may be programmed to store parameters including dimensions of the vehicle 100 body 160, location and direction of the sensor 130 relative to a vehicle 100 body 160, dimensions of received images, and/or optical parameters of the sensor 130 such as a focal point, etc. The computer 110 may be programmed to determine a location and/or dimensions of each image pixel of the image of center lines 220, etc., based at least in part on the stored parameters and the received images. Thus, in one example, the computer 110 may be programmed to determine the position offset $e_y$ relative to a lane 200 center line 220 based on a number of pixels of the image between the center line 220 and a vehicle 100 longitudinal axis (known based on stored location and/or direction of the sensor 130 relative to the vehicle 100 body 160).

Yet further additionally or alternatively, the computer 110 may be programmed to determine a vehicle 100 heading $\psi$ based on data received from a vehicle 100 location sensor 130, e.g., the GPS sensor 130 and to determine the heading offset $e_\psi$ based on the determined vehicle 100 heading $\psi$ and a curvature of the detected boundaries 210 (or a tangent line to an imaginary center line 220 having a same curvature as the detected road boundaries 210).

The HMI 140 may be configured to receive information from a user, such as a human operator, during operation of the vehicle 100. Moreover, a HMI 140 may be configured to present information to the user. Thus, a HMI 140 may be located in the passenger compartment of the vehicle 100. In one example, the computer 110 may be programmed to receive via the HMI 140 input requesting to maintain a position of the vehicle 100 at a center line 220 of the lane 200 (see FIG. 2).

Figure 2:
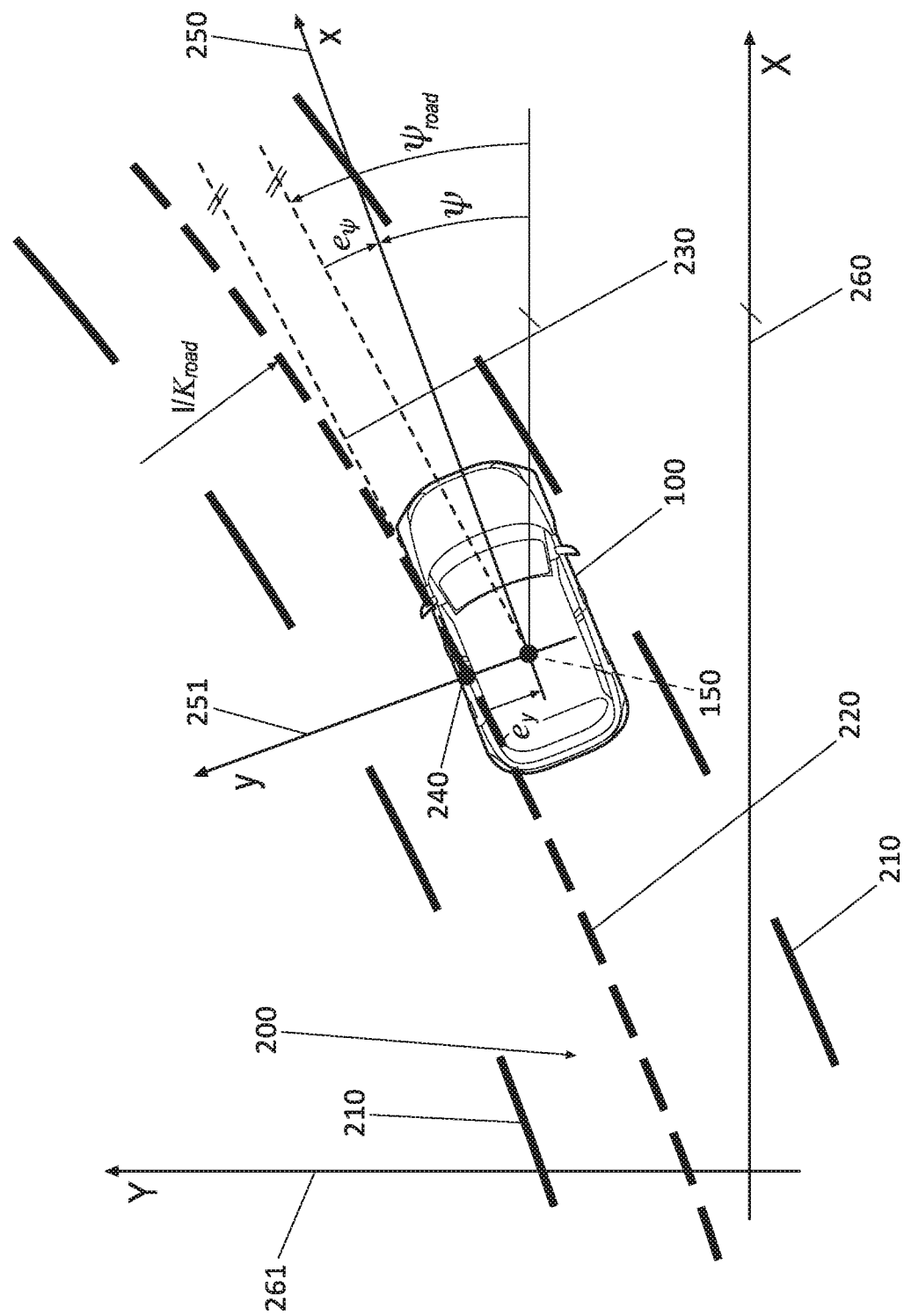
FIG. 2 is a diagram showing the vehicle of FIG. 1 moving in a lane while having a vehicle position offset relative to a lane center line.

With reference to FIG. 2, the vehicle 100 computer 110 can be programmed to determine, e.g., based at least in part on image data received from a vehicle 100 camera sensor 130 as described above, a lane curvature $\kappa_{road}$, a vehicle 100 position offset $e_y$ relative to a lane 200 center line 220, and a vehicle 100 heading offset $e_\psi$ (i.e., a vehicle 100 heading $\psi$, relative to the lane curvature $\kappa_{road}$), and to compute an adjusted lane curvature $\kappa_{road.cor}$ and an adjusted vehicle heading offset $e_{\psi.cor}$ based on a vehicle speed $V_x$, a vehicle yaw rate $r_{veh}$ and the position offset $e_y$.

In this disclosure the term "line" is not limited to a straight line or line segment. A center line 220 is typically an imaginary line in a longitudinal direction of a road lane 200 having a same lateral distance to a right and a left border (or boundary 210) of the road lane 200. Thus, a multi-lane road may have multiple center lines 220, i.e., one center line 220 per each road lane 200. A shape of a center line 220 is similar to a shape of a road, e.g., a center line 220 of a straight road is a straight line (i.e., having zero curvature), whereas a center line 220 of a curved road is a curved line. Thus, a center line 220 generally defines or matches curvature of a roadway. The computer 110 may be programmed to detect lane boundary 210 (or marking) of the vehicle 100 lane 200 from the received image data, and to determine the center line 220 of the vehicle 100 lane 200 based on the detected lane boundary 210 (or marking), e.g., by determining an imaginary line with points having a same distance to a right and left lane boundaries 210.

In the present context, a tangent line 230 is a line that is tangent to (or just touching) the center line 220 at a point 240 on the center line 220 that is a nearest point to the vehicle 100 reference point 150. The vehicle 100 position offset $e_y$ (or path offset) in the present context, is a distance of a reference point 150 of the vehicle 100 to the nearest point 240 on the center line 220. As discussed above, the computer 110 may be programmed to actuate a vehicle 100 steering actuator 120 such as the EPS actuator 120 to maintain a vehicle 100 position at the center line 220 (while navigating in the vehicle 100 in the lane 200 in the longitudinal direction). Thus, the computer 110 may be programmed to minimize the position offset $e_y$.

FIG. 2 shows a first vehicle Cartesian coordinate system defined by (i) an origin at the vehicle 100 reference point 150, (ii) an x axis 250 that is defined by a vehicle 100 longitudinal axis through the point 150, and (iii) a y axis 251 perpendicular to the axis 250 and defining a vehicle 100 lateral axis.

FIG. 2 further shows a second or global coordinate system defined by an X axis 260 and a Y axis 261, e.g., a Cartesian coordinate system, that is independent from the vehicle 100 location and/or orientation. The second coordinate system may be referred to as a "global" coordinate system because it is defined independent of a vehicle 100 and is typically defined for a geographic area, such as the coordinate system of a global positioning system (GPS) that is defined for the world. Alternatively or additionally, the second coordinate system could include any other location coordinate system providing geo-coordinates (i.e., latitude, longitude pairs) or the like. In the present context, a vehicle 100 heading $\psi$ is defined by an angle between (i) a vehicle 100 longitudinal axis from a vehicle 100 reference point 150 in a direction of a vehicle 100 movement, and (ii) the X axis of the global coordinate system.

In the present context, a "curve" (or curved line) is a line with a finite radius, whereas a "straight line" is a line with an infinite radius. As an example, a curvature κ may be specified at a given point of the curvature with parameter κ, i.e., a radius of a circle tangent to the curvature at the respective point. A lane 200 curvature $\kappa_{road}$ (which may be also referred to as road curvature $\kappa_{road}$) is a curvature of the center line 220 of the lane 200 at a nearest point 240 of the center line 220 to a reference point 150 of the vehicle 100.

based on the lane 200 curvature $\kappa_{road}$, and to compute the adjusted vehicle heading offset $e_{\psi.cor}$ and the adjusted lane curvature $\kappa_{road.cor}$ based on the vehicle heading offset $e_\psi$. The computer 110 may be programmed to perform a lateral motion control (LMC) such as a lane centering based on the position offset $e_y$, the adjusted vehicle heading offset $e_{\psi.cor}$, and the adjusted lane curvature $\kappa_{road.cor}$. Table 1 below provides a list of example variables, and their respective definitions, that can be used in determining an adjusted lane curvature $\kappa_{road}$ and/or vehicle heading offset $e_\psi$.

TABLE 1

| Variable | Definition |
|---|---|
| $e_y$ | A lateral distance of a reference point of the vehicle to a nearest point on the center line. |
| $\psi$ | Heading of the vehicle with respect to the global coordinate system. |
| $e_\psi$ | Vehicle heading offset, i.e., an angle defining orientation of the vehicle longitudinal axis relative to the tangent road (or lane) center line at the point on the center line that is closest to the vehicle reference point. |
| $\kappa_{road}$ | Curvature of the lane. |
| $d\kappa_{road}/dt$ | Rate of change of lane curvature. |
| $\dot{e}_y$ | Derivative of the position offset. |
| $\kappa_{road.cor}$ | Adjusted (or corrected) lane curvature. |
| $e_{\psi.cor}$ | Adjusted (or corrected) vehicle heading offset. |
| $\dot{e}_\psi$ | Derivative of the heading offset. |
| $r_{veh}$ | Vehicle yaw rate. |
| $r_{road}$ | Road yaw rate, i.e., road curvature multiplied by the vehicle longitudinal speed. |
| $r_{bias}$ | Bias or error of yaw rate which is a difference between the road yaw rate and the vehicle yaw rate. |
| $e_{\psi.bias}$ | Vehicle heading offset bias, i.e., a bias or error of the heading offset which is a difference between the actual and estimated vehicle heading. |
| $\zeta_{r.veh}$ | Variance of noise included in the vehicle yaw rate data. |
| $\zeta_{e\psi.bias}$ | Variance of the vehicle heading offset bias. |
| $\zeta_{r.bias}$ | Variance of the yaw rate bias. |
| $\zeta_{r.road}$ | Variance of noise included in the road yaw rate data. |
| $e_{y.m}$ | Camera-based vehicle position offset, i.e., vehicle position offset determined (or measured) based on camera sensor data. |
| $e_{\psi.m}$ | Camera-based vehicle heading offset, i.e., vehicle heading offset determined (or measured) based on camera sensor data. |

As discussed above, the vehicle 100 computer 110 may be programmed to determine physical attributes of the vehicle 100 based on data received from the sensors 130. In one example, the computer 110 may be programmed to determine a scalar numerical value of the vehicle 100 speed based on data received from a vehicle 100 speed sensor 130. In another example, the computer 110 may be programmed to receive speed vector data based on the Cartesian coordinate system with the origin at the reference point 150. For example, the computer 110 may be programmed to determine a longitudinal speed $V_x$ in the direction of the x axis and a lateral speed $V_y$ in the direction of the y axis. The computer 110 may be programmed to determine a vehicle 100 yaw rate $r_{veh}$ based on data received from a vehicle 100 yaw rate sensor 130.

In the present context, the terms "adjusted" or "corrected" mean that an error in determining a numeric value of a physical parameters is reduced or minimized. As discussed in examples below with reference to FIG. 4, the computer 110 may be programmed to compute an adjusted lane curvature $\kappa_{road.cor}$ and/or an adjusted vehicle heading offset $e_{\psi.cor}$. Thus, the computer 110 may be programmed to determine the lane curvature $\kappa_{road}$ and/or the vehicle heading offset $e_\psi$, based on, e.g., the image data from the camera sensor(s) 130, and to adjust them based on other data, e.g., other vehicle 100 sensor 130 data such as speed, yaw rate, etc.

As discussed in examples below, the computer 110 may be programmed to determine a vehicle 100 heading offset $e_\psi$ In FIG. 3, an example control system 300 is illustrated. The system 300 can control a lateral motion of the vehicle 100 based on the lane curvature $\kappa_{road}$ and the vehicle heading offset $e_\psi$. As discussed further below with reference to FIG. 4, the adjusted lane curvature $\kappa_{road.cor}$ and/or the adjusted vehicle heading offset $e_{\psi.cor}$ can be computed. Then, as discussed below with reference to equation (24), a performance of a lateral motion control such as the LMC control system shown in FIG. 3 may be improved by controlling the vehicle lateral motion based on the adjusted lane curvature $\kappa_{road.cor}$ and/or the adjusted vehicle heading offset $e_{\psi.cor}$ instead of controlling based on the lane curvature $\kappa_{road}$ and the vehicle heading offset $e_\psi$.

Figure 3:
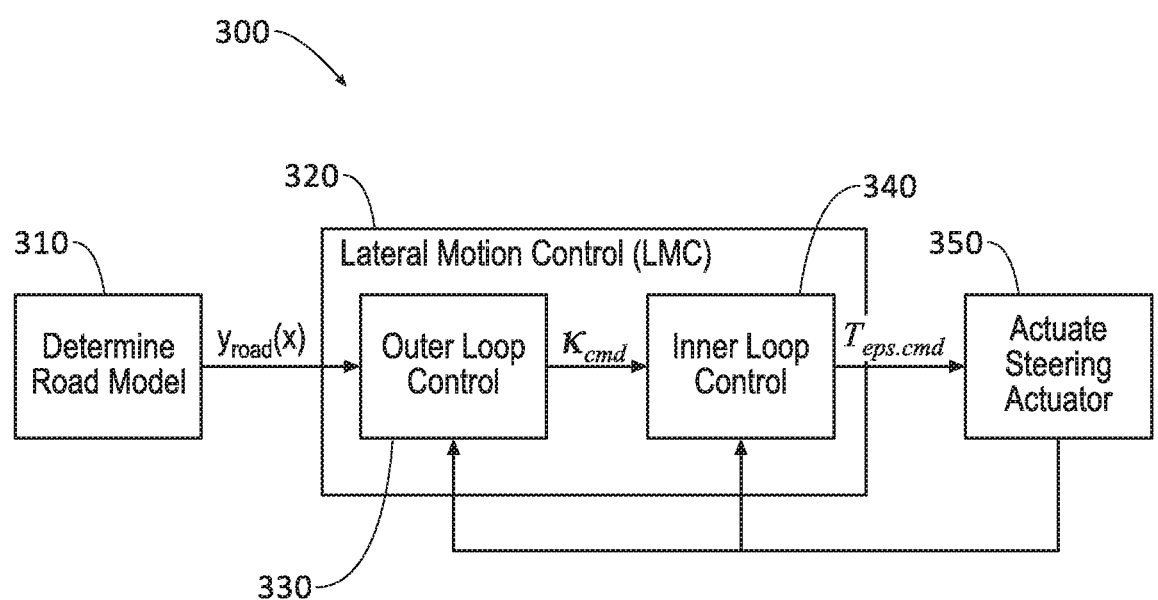
FIG. 3 shows an exemplary block diagram for vehicle lateral motion control (LMC).

As illustrated in FIG. 3, the computer 110 may be programmed to execute blocks of an example closed-loop control system 300 to maintain a lateral position of the vehicle 100 at the center line 220 (i.e., to perform lane-centering). Additionally or alternatively, other types of lateral motion control techniques may be utilized to maintain the vehicle 100 lateral position on the center line 220 or within a predetermined lateral distance, e.g., 50 centimeters (cm), from the center line 220. Additionally or alternatively, the computer 110 may be programmed to execute the blocks of the process 300 in a semi-autonomous or autonomous mode. For example, in a semi-autonomous mode, the computer 110 may be programmed to perform lane centering by executing the blocks of the process 300 while the vehicle 100 braking and/or propulsion is controlled based on user input.

In a block 310, the computer 110 may be programmed to estimate the vehicle 100 position offset $e_y$, the vehicle 100 heading offset $e_\psi$, the lane 200 curvature $\kappa_{road}$, and/or the curvature rate $d\,\kappa_{road}/dt$ of the lane 200 based on data received from the sensor 130. In one example, the computer 110 may be programmed to determine a road model based on data received from the sensors 130, e.g., one or more camera sensors 130. Further, the computer 110 may be programmed to determine the position offset $e_y$, the vehicle 100 heading offset $e_\psi$, and the lane 200 curvature $\kappa_{road}$ based on the determined road model.

$$y_{road}(x)=A_0+A_1x+A_2x^2+A_3x^3 \tag{1}$$

$$e_y=A_0 \tag{i}$$

$$e_\psi=A_1 \tag{ii}$$

$$\kappa_{road}=2A_2 \tag{iii}$$

$$d\kappa_{road}/dt=6A_3 \tag{iv}$$

For example, a road model may be specified by an example polynomial equation (1) which predicts points on the center line 220 relative to the vehicle 100 current position. Parameter x in equation (1) represents a distance ahead of the vehicle 100 with respect to the Cartesian coordinate system with the origin at the vehicle 100 reference point 150. As shown in example equation (i)-(iv), the position offset $e_y$, the vehicle 100 heading offset $e_\psi$, the lane curvature $\kappa_{road}$, and the rate of change of the lane curvature $d\,\kappa_{road}/dt$ based on the coefficients $A_0, A_1, A_2, A_3$ of the road model. Thus, the computer 110 may be programmed to compute the position offset $e_y$, the vehicle 100 heading offset $e_\psi$, the lane curvature $\kappa_{road}$, and the rate of change of the lane curvature $d\,\kappa_{road}/dt$ based on the coefficients $A_0, A_1, A_2, A_3$ of the road model.

$$\begin{bmatrix} \dot{e}_y \\ \dot{e}_\psi \end{bmatrix} = \begin{bmatrix} 0 & V_x \\ 0 & 0 \end{bmatrix}\begin{bmatrix} e_y \\ e_\psi \end{bmatrix} + \begin{bmatrix} 0 \\ -V_x \end{bmatrix}\kappa_{veh} + \begin{bmatrix} 0 \\ V_x \end{bmatrix}\kappa_{road} \tag{2}$$

With reference to equation (2) and Table 1, the computer 110 may be programmed based on a dynamic model including state variables to determine the position offset $e_y$ and the heading offset $e_\psi$. Here should be noted that equation (2) may rely on assuming that (i) the heading offset $e_\psi$ is small, e.g., less than 10 degrees, and (ii) a vehicle 100 lateral velocity is negligible, e.g., less than 0.1 meters/second or less than 1% of the longitudinal speed $V_x$. A lateral speed is a speed in a direction of y axis 251. In the present context, the vehicle 100 path curvature $\kappa_{road}$ is a curvature of a path on which the vehicle 100 moves at a given location. In one example, the curvature the curvature $\kappa_{veh}$ may be determined based on the vehicle 100 yaw rate $r_{veh}$ and the vehicle 100 longitudinal speed $V_x$. For example, the curvature $\kappa_{veh}$ may be estimated to be a result of yaw rate $r_{veh}$ divided by the longitudinal speed $V_x$. In another example, the curvature $\kappa_{veh}$ may be determined using dead reckoning techniques, i.e., estimating a tangent line to a vehicle 100 path based on one or more recent location(s) and a current location of the vehicle 100.

In a lateral motion control block 320, the computer 110 can determine a torque control command $T_{eps.cmd}$ for actuating a vehicle 100 steering actuator 120, e.g., the EPS actuator 120. As shown in FIG. 3, the lateral motion control block 320 includes an outer loop control block 330 and an inner loop control block 340. The lateral motion control block 320 and its sub-blocks 330, 340, of FIG. 3 are for purposes of example only and not to limit the scope and/or type of a lateral motion control technique that can be utilized in the present context.

$$\kappa_{cmd}=\kappa_{road}+K_1e_y+K_2e_\psi \tag{3}$$

In the outer loop control block 330, the computer 110 may be programmed to generate a target curvature command $\kappa_{cmd}$ for the inner loop controller control block 340. In one example, the computer 110 may be programmed to determine the target curvature command $\kappa_{cmd}$, e.g., the measured road curvature, based on equation (3). Using conventional control system design techniques, the gains $K_1$ and $K_2$ may be selected such that poles of the closed-loop system of process 300 are placed at desired locations. In one example, "desired location" are locations in a s-plane that result in a stable control system performance, as known and/or that result in minimum settling time, minimal error, etc.

In the inner loop control block 340, the computer 110 may be programmed to generate torque control command $T_{eps.cmd}$ for the electronic power steering (EPS) actuator 120 to minimize an error between the target curvature command $\kappa_{cmd}$ and an actual vehicle path curvature $\kappa$. The inner loop control block 340 may be implemented by utilizing any suitable control technique, e.g., proportional integral derivative (PID) control.

In an "actuate steering actuator" block 350, the computer 110 may be programmed to actuate the steering actuator 120 based at least on the received torque control command $T_{eps.cmd}$. Additionally, a currently applied torque applied by the EPS actuator 120 and/or a current steering angle is provided as a feedback value to the block 320 to close the control loop of the process 300. In one example, the steering actuator 120 may include a steering angle sensor 130, a steering torque sensor 130, etc., and the computer 110 may be programmed to receive the sensor 130 data from the sensors 130 included in and/or mechanically connected to the steering system and apply the received data as feedback value in the block 320.

Figure 4:
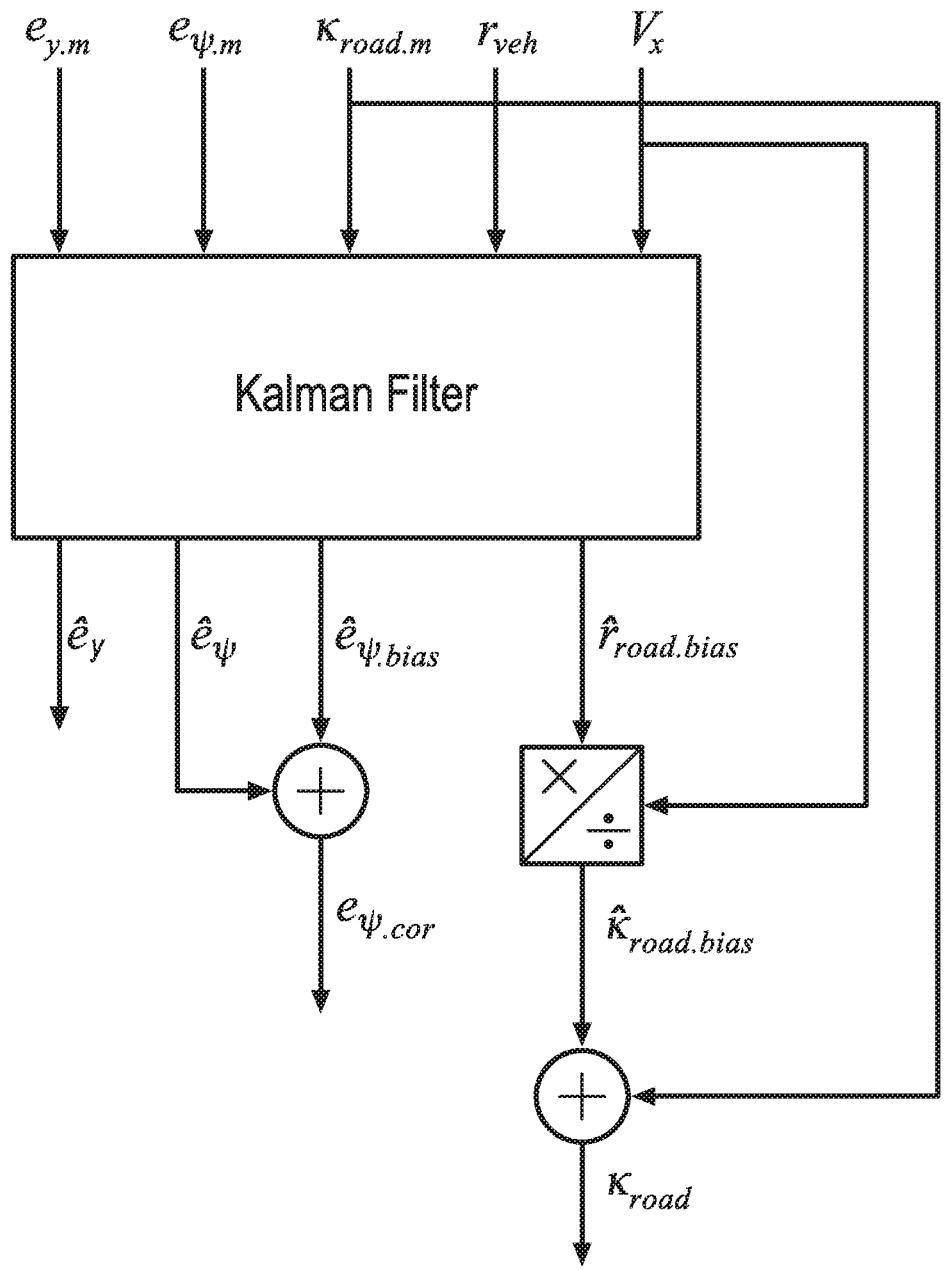
FIG. 4 shows an exemplary block diagram for adjusting determined values of lane curvature and vehicle heading.

With reference to FIG. 4 and Table 1, the computer 110 may be programmed to compute the adjusted lane curvature $\kappa_{road.cor}$ and/or the adjusted vehicle heading offset $e_{\psi.cor}$. As discussed with reference to equations (4)-(23), the computer 110 may be programmed to compute the adjusted road curvature $\kappa_{road.cor}$ based on the road curvature $\kappa_{road}$ (that may be determined based on the received image data), an estimated yaw rate bias $\hat{r}_{bias}$, and a vehicle speed $V_x$. The computer 110 may be programmed to estimate the yaw rate bias $\hat{r}_{bias}$ and the estimated vehicle heading offset bias $\hat{e}_{\psi.bias}$, and to compute the adjusted lane curvature $\kappa_{road.cor}$ and the adjusted vehicle heading offset $e_{\psi.cor}$ based on the estimated yaw rate bias $\hat{r}_{bias}$ and the estimated vehicle heading offset bias $\hat{e}_{\psi.bias}$.

$$\begin{bmatrix} \dot{e}_y \\ \dot{e}_\psi \end{bmatrix} = \begin{bmatrix} 0 & V_x \\ 0 & 0 \end{bmatrix}\begin{bmatrix} e_y \\ e_\psi \end{bmatrix} + \begin{bmatrix} 0 & 0 \\ 1 & -1 \end{bmatrix}\begin{bmatrix} r_{road} \\ r_{veh} \end{bmatrix} + \begin{bmatrix} V_x & 0 \\ 0 & 1 \end{bmatrix}\begin{bmatrix} \hat{e}_{\psi.bias} \\ \hat{r}_{bias} \end{bmatrix} \tag{4}$$

Equation (4) shows an example model of the vehicle 100 lateral motion which includes a relationship of the estimated yaw rate bias $\hat{r}_{bias}$ and estimated vehicle heading offset $\hat{e}_{\psi.bias}$ to the sensor 130 data such as the vehicle 100 yaw rate $r_{veh}$ and road yaw rate $r_{road}$, and vehicle 100 lateral motion data (i.e., the position offset $e_y$ and the heading offset $e_\psi$).

With reference to equation (5), the road (or lane 200) yaw rate $r_{road}$ is calculated based on the road curvature $\kappa_{road}$ and vehicle speed $V_x$.

$$r_{road} = V_x \kappa_{road} \quad (5)$$

$$\dot{x}(t) := A(t)x(t) + x(t) = B(t)u(t) + W\zeta(t) \quad (6)$$

$$y(t) = C(t)x(t) + \upsilon(t) \quad (7)$$

$$x = [\, e_y \quad e_\psi \quad e_{\psi\cdot bias} \quad r_{bias} \,]^T \quad (8a)$$

$$\zeta = [\, \zeta_{r_{road}} \quad \zeta_{r_{veh}} \quad \zeta_{e_{\psi\cdot bias}} \quad \zeta_{r_{bias}} \,]^T \quad (8b)$$

$$y = [\, e_{y\cdot m} \quad e_{\psi\cdot m} \,]^T \quad (8c)$$

$$\upsilon = [\, \upsilon_{e_y} \quad \upsilon_{e_\psi} \,]^T \quad (8d)$$

$$A = \begin{bmatrix} 0 & V_x & V_x & 0 \\ 0 & 0 & 0 & 1 \\ 0 & 0 & 0 & 0 \\ 0 & 0 & 0 & 0 \end{bmatrix} \quad (8e)$$

$$B = \begin{bmatrix} 0 & 0 \\ 1 & -1 \\ 0 & 0 \\ 0 & 0 \end{bmatrix} \quad (8f)$$

$$W = \begin{bmatrix} 0 & 0 & 0 & 0 \\ 1 & -1 & 0 & 0 \\ 0 & 0 & 1 & 0 \\ 0 & 0 & 0 & 1 \end{bmatrix} \quad (8g)$$

$$C = \begin{bmatrix} 1 & 0 & 0 & 0 \\ 0 & 1 & 0 & 0 \end{bmatrix} \quad (8h)$$

To include stochastic disturbance, i.e. process noise, and errors of variables of the model of equation (4), the computer 110 may be programmed as shown in equations (6)-(7). Equations (8a)-(8h) specify matrices included in the equations (6)-(7). As shown in equation (6), the model is augmented with variables pertaining to the heading offset bias $e_{\psi\cdot bias}$ and the yaw rate bias $r_{bias}$. Dynamics of the biases are modeled as a random walk process. A random walk process results when an uncorrelated signal is integrated over time. The uncorrelated signal relates to a process noise that acts as a disturbance to the plant dynamics. The process noise is defined by the white noise $\zeta$ associated with road yaw rate $r_{road}$, heading offset bias $e_{\psi\cdot bias}$, vehicle yaw rate $r_{veh}$, and the yaw rate bias $r_{bias}$. As shown in equation (8), white noise $\nu$ is included in the relation to the camera-based measurements, i.e., camera-based position offset $e_{y\cdot m}$ and camera-based heading offset $e_{\psi\cdot m}$. The camera-based measurements are determined by the computer 110 programming based on the image data received from the camera sensor(s) 130 of the vehicle 100.

$$x(k) = F(k-1)x(k-1) + G(k-1)u(k-1) + \Omega\zeta(k-1) \quad (9)$$

$$y(k) = H(k)x(k) + \upsilon \quad (10)$$

$$F = \begin{bmatrix} 1 & T_s V_x & T_s V_x & 0 \\ 0 & 1 & 0 & T_s \\ 0 & 0 & 1 & 0 \\ 0 & 0 & 0 & 1 \end{bmatrix} \quad (11)$$

$$G = \begin{bmatrix} 0 & 0 \\ T_s & -T_s \\ 0 & 0 \\ 0 & 0 \end{bmatrix} \quad (12)$$

$$\Omega = \begin{bmatrix} 0 & 0 & 0 & 0 \\ T_s & -T_s & 0 & 0 \\ 0 & 0 & T_s & 0 \\ 0 & 0 & 0 & T_s \end{bmatrix} \quad (13)$$

$$H = \begin{bmatrix} 1 & 0 & 0 & 0 \\ 0 & 1 & 0 & 0 \end{bmatrix} \quad (14)$$

Equations (6)-(7) are continuous-time equations, however, a computer 110 is typically programmed based on a discrete-time model. In a discrete-time model, the computer 110 is programmed to compute one or more computational step(s) repetitively in equally spaced time intervals, which may be referred to as sampling time $T_s$, e.g., 100 milliseconds (ms). The discrete-time model of equations (9)-(10) may be obtained from the continuous-time model of equations (6)-(8), by applying conventional Z-transform based upon the conventional Zero-Order-Hold (ZOH) method. Equations (11)-(14) show definitions of F, G, $\Omega$, and H of equations (9)-(10).

$$\hat{x}(k|k-1) = F\hat{x}(k-1|k-1) + Gu(k-1) \quad (15)$$

$$\hat{\varepsilon}(k|k-1) = y(k) - H\hat{x}(k|k-1) \quad (16)$$

$$\hat{x}(k|k) = \hat{x}(k|k-1) + K(k)\hat{\varepsilon}(k|k-1) \quad (17)$$

$$K = PH^T(HPH^T + R)^{-1} \quad (18)$$

$$R = \text{diag}([\text{Var}(\nu_{e_y})\text{Var}(\nu_{e_\psi})]) \quad (19)$$

Based on equations (9)-(10), Kalman filter may be specified as given by equations (15)-(17), to estimate the yaw rate bias $r_{bias}$ and heading offset bias $e_{\psi\cdot bias}$, and to filter out the measurement noises. The symbol "hat" in equations (15)-(17) denotes an estimate of the respective state. Matrices $\hat{x}(k|k-1)$ and $\hat{x}(k|k)$ are a-priori and a-posteriori state vector updates. Matrix $\hat{\varepsilon}(k|k-1)$ is a-priori prediction error. With reference to equation (18), the gain matric K of the Kalman filter is computed. With reference to equation (19), matrix R is a measurement noise covariance matrix that is determined based on variance of vehicle heading offset noise $\nu_{e_\psi}$ and a variance of a vehicle position offset noise $\nu_{e_y}$. A Var operation returns a variance of the respective parameter. A diag operation returns a diagonal square matrix with all off-diagonal coefficients equal to zero and all diagonal coefficients equal to the values given in the bracket [ ].

$$P - FPF^T + FPH^T(HPH^T + R)^{-1}HP - Q = 0 \quad (20)$$

$$Q = \text{diag}([\text{Var}(\zeta_{r_{road}})\text{Var}(\zeta_{r_{veh}})\text{Var}(\zeta_{e_{\psi\cdot bias}})\text{Var}(\zeta_{r\cdot bias})]) \quad (21)$$

With reference to equation (20), matrix P is an estimated error covariance, which may be defined based on a Discrete Algebraic Riccati Equation (DARE). With reference to equation (21), matrix Q is the state covariance matrix.

$$e_{\psi\cdot cor} = \hat{e}_\psi + \hat{e}_{\psi\cdot bias} \quad (22)$$

$$\kappa_{road\cdot cor} = \kappa_{road\cdot m} + \hat{r}_{bias}V_x^{-1} \quad (23)$$

Now, with reference to equations (22)-(23) and FIG. 4, the computer 110 may be programmed to determine the adjusted heading offset $e_{\psi\cdot cor}$ and the adjusted lane curvature $\kappa_{road\cdot cor}$ based on estimated values of the heading offset bias $e_{\psi.bias}$ and the lane curvature bias $\kappa_{road.cor}$.

With reference to equations (19), (22), (23), the computer 110 may be programmed to compute the adjusted lane curvature $\kappa_{road.cor}$ and the adjusted vehicle heading offset $e_{\psi.cor}$ based on a variance of vehicle heading offset noise Var $(v_{e_\psi})$ and a variance of a vehicle position offset noise Var$(v_{e_y})$. The variance of vehicle heading offset noise Var $(v_{e_\psi})$ and the variance of a vehicle position offset noise Var$(v_{e_y})$ are adjustable parameters (or calibration values) which may be selected based on empirical steps, e.g., adjusted based on lab test results.

$$y_{road.cor}(x) = e_y + e_{\psi.cor} x + \tfrac{1}{2}\kappa_{road.cor} x^2 + \tfrac{1}{6} d\kappa_{road}/dt\, x^3 \qquad (24)$$

In one example, the lateral motion control (LMC) may be improved by determining the road model $y_{road}(x)$ based on the adjusted heading offset $e_{\psi.cor}$ and the adjusted lane curvature $\kappa_{road.cor}$. As discussed above, in the block 310, the computer 110 may be programmed to determine the road model $y_{road}(x)$ based on the vehicle 100 position offset $e_y$, the vehicle 100 heading offset $e_\psi$, and/or the lane 200 curvature $\kappa_{road}$. The LMC block 320 then controls the lateral motion of the vehicle 100 based at least in part on the road model $y_{road}(x)$. As discussed above, with reference to FIG. 4, the computer 110 may be programmed to determine the adjusted heading offset $e_{\psi.cor}$ and the adjusted lane curvature $\kappa_{road.cor}$. Thus, in one example, in the block 310, the computer 110 may be programmed, in contrast to equation (1), to compute an adjusted road model $y_{road.cor}(x)$ based on equation (24). In other words, the lateral control process 300 may operate based on the adjusted heading offset $e_{\psi.cor}$ and the adjusted lane curvature $\kappa_{road.cor}$. Thus, the performance of the control process 300 may be improved, e.g., an error in maintaining the lateral position of the vehicle 100 on the center line 220 may be reduced when the control blocks 320 received the adjusted road model $y_{road.cor}(x)$ from the block 310 instead of the road model of equation (1).

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
   determining, based on image data received from a vehicle camera sensor, a lane curvature, a vehicle position offset relative to a lane center line, and a vehicle heading;
   determining a yaw rate bias and a vehicle heading offset bias, wherein the yaw rate bias measures a difference between a road yaw rate and a vehicle yaw rate, and the vehicle heading offset bias measures a difference between the vehicle heading and an estimated vehicle heading;
   computing an adjusted lane curvature and an adjusted vehicle heading based on a vehicle speed, the vehicle yaw rate, the vehicle position offset, the yaw rate bias, and the vehicle heading offset bias; and
   controlling vehicle steering based at least in part on the adjusted lane curvature and the adjusted vehicle heading.

2. The method of claim 1, wherein controlling vehicle steering includes performing vehicle lane centering.

3. The method of claim 1, wherein the vehicle position offset is a lateral distance of a reference point of the vehicle to a nearest point on the lane center line.

4. The method of claim 1, wherein the vehicle heading is defined by a vehicle longitudinal axis from a vehicle reference point in a direction of a vehicle movement.

5. The method of claim 1, further comprising:
   determining a vehicle heading offset based on the lane curvature; and
   computing an adjusted vehicle heading offset and the adjusted lane curvature based at least in part on the vehicle heading offset.

6. The method of claim 1, further comprising computing the adjusted lane curvature and the adjusted vehicle heading based on a variance of vehicle heading offset noise and a variance of a vehicle position offset noise.

7. The method of claim 1, further comprising computing, based on the lane curvature determined based on the received image data, the yaw rate bias, the vehicle speed, and the adjusted lane curvature.

8. A system, comprising a processor and a memory, the memory storing instructions executable by the processor to:
determine, based on image data received from a vehicle camera sensor, a lane curvature, a vehicle position offset relative to a lane center line, and a vehicle heading;
determine a yaw rate bias and a vehicle heading offset bias, wherein the yaw rate bias measures a difference between a road yaw rate and a vehicle yaw rate, and the vehicle heading offset bias measures a difference between the vehicle heading and an estimated vehicle heading;
compute an adjusted lane curvature and an adjusted vehicle heading based on a vehicle speed, the vehicle yaw rate, the vehicle position offset, the yaw rate bias, and the vehicle heading offset bias; and
control vehicle steering based at least in part on the adjusted lane curvature and the adjusted vehicle heading.

9. The system of claim 8, wherein the instructions to control vehicle steering further include instructions to perform vehicle lane centering.

10. The system of claim 8, wherein the vehicle position offset is a lateral distance of a reference point of the vehicle to a nearest point on the lane center line.

11. The system of claim 8, wherein the vehicle heading is defined by a vehicle longitudinal axis from a vehicle reference point in a direction of a vehicle movement.

12. The system of claim 8, wherein the instructions further include instructions to:
determine a vehicle heading offset based on the lane curvature; and
compute an adjusted vehicle heading offset and the adjusted lane curvature based at least in part on the vehicle heading offset.

13. The system of claim 12, wherein the instructions further include instructions to compute the adjusted lane curvature and the adjusted vehicle heading based on a variance of vehicle heading offset noise and a variance of a vehicle position offset noise.

14. The system of claim 8, wherein the instructions further include instructions to compute, based on the lane curvature determined based on the received image data, the yaw rate bias, the vehicle speed, and the adjusted lane curvature.

15. A system, comprising:
means for determining, based on image data received from a vehicle camera sensor, a lane curvature, a vehicle position offset relative to a lane center line, and a vehicle heading;
means for determining a yaw rate bias and a vehicle heading offset bias, wherein the yaw rate bias measures a difference between a road yaw rate and a vehicle yaw rate, and the vehicle heading offset bias measures a difference between the vehicle heading and an estimated vehicle heading;
means for computing an adjusted lane curvature and an adjusted vehicle heading based on a vehicle speed, the vehicle yaw rate, the vehicle position offset, the yaw rate bias, and the vehicle heading offset bias; and
means for controlling vehicle steering based at least in part on the adjusted lane curvature and the adjusted vehicle heading.

16. The system of claim 15, wherein controlling vehicle steering includes performing vehicle lane centering.

17. The system of claim 15, further comprising:
means for determining a vehicle heading offset based on the lane curvature; and
means for computing the adjusted vehicle heading offset and the adjusted lane curvature based at least in part on the vehicle heading offset.

* * * * *